Feb. 25, 1947.                J. FRANKEL                2,416,520
                        FEEDING DEVICE FOR ANIMALS
                           Filed Oct. 11, 1946
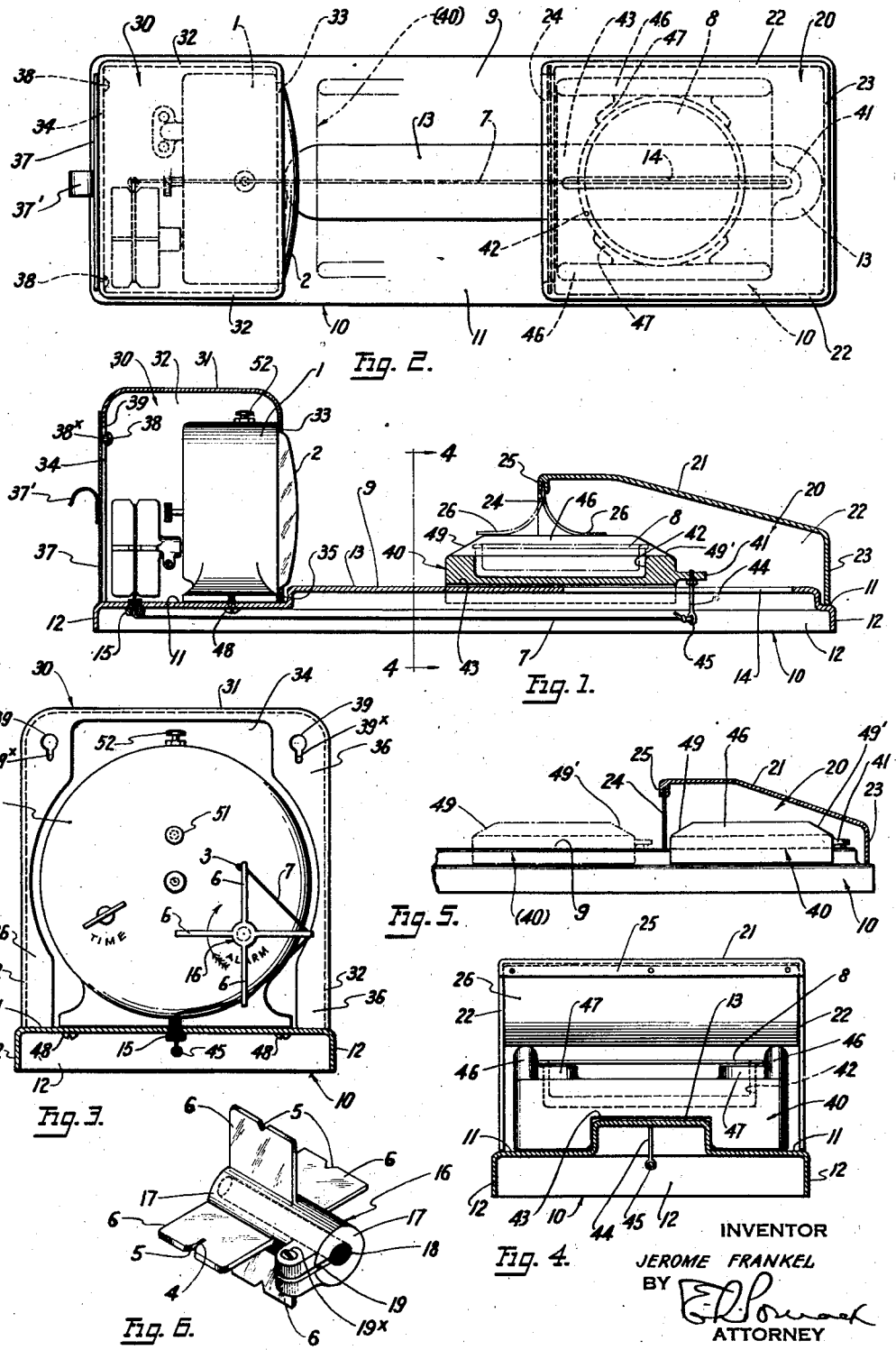
INVENTOR
JEROME FRANKEL
BY
ATTORNEY Patented Feb. 25, 1947

2,416,520

UNITED STATES PATENT OFFICE 2,416,520

FEEDING DEVICE FOR ANIMALS

Jerome Frankel, Larchmont, N. Y.

Application October 11, 1946, Serial No. 702,694

14 Claims. (Cl. 161—10)

This invention relates to devices for feeding domestic pets, such as dogs and cats, at a selected time for which the device has been set.

One of the objects of the invention is to provide an automatic feeder of simple construction having few parts which can be cheaply produced and assembled.

Another object is to provide an automatic feeder of neat and attractive appearance, and which will be fool-proof and positive in operation.

A further object is to provide an automatic feeder in which an ordinary alarm clock of a standard shape and size (one of the most popular variety found on the market) may be installed without change, by merely securing it in the feeder by a couple of screws and replacing the winding knob by a small winding attachment, as will be described.

A still further object is to provide an automatic feeder as described which is prepared for operation at a selected time with a minimum of effort, and in which the manipulative parts, for winding the time and alarm springs, and for setting the time hands and the alarm (feeding time), are readily accessible.

Another object of the invention is to provide an automatic feeder in which all operative parts are enclosed and out of the reach of the animal or other interference. Another important object is to provide an automatic feeder which will have all the advantages and features enumerated above and which at the same time will be sanitary and easily cleaned.

For the attainment of the foregoing and such other objects as may appear or be pointed out herein I have shown a preferred embodiment of my invention in the accompanying drawing, wherein:

Figure 1 is an elevational section through the improved device;

Figure 2 is a top view thereof;

Figure 3 is an end view of the end of the device containing the alarm clock;

Figure 4 is a cross-section taken on the line 4—4 of Figure 1 looking towards the food compartment;

Figure 5 is a side elevation, on reduced scale, of the food compartment and the feeding stage, showing the feeding tray in its two positions; and Figure 6 is a perspective view of the winding attachment which replaces the alarm rewinding knob of the alarm clock.

The improved device comprises four main parts, viz., a base 10, a food compartment 20 at one end thereof, a clock compartment 30 at the other end of the base, and a feeding tray 40 which is slidably mounted on the base. Tray 40, upon which a dish containing the food is held, is normally retained within food compartment 20, and at the time set for feeding, is moved out of the food compartment into the space 9 between compartments 20 and 30 which serves as the feeding stage (9).

Base 10, which is preferably a metal stamping, is hollow to provide a space—for a purpose soon apparent—under its raised floor 11, which space is closed by the side and end flanges 12. Food compartment 20, which is also preferably a metal stamping, has a top wall 21, the rear portion of which is sloped, as shown in Figure 1, chiefly to improve the appearance of the device, side walls 22 and a rear wall 23. The front of the food compartment, i. e., facing feeding stage 9, is open, designated 24, except for a narrow transverse flange 25 at the top of opening 24. Food compartment 20 is positioned at one end of base 10 with its side walls 22, Figure 4, and rear wall 23, Figure 1, resting on raised floor 11 of base 10 and secured thereto in any suitable manner (not shown). Clock compartment 30, likewise preferably a metal stamping, is open at the bottom—as is food compartment 20—and has a top wall 31 and side walls 32. The front of the clock compartment, i. e., facing feeding stage 9, has a large opening 33 through which appears the face 2 of an alarm clock 1 contained within the compartment. The other end or rear of the clock compartment has a large opening 34, of the irregular but symmetrical outline shown in Figure 3 and through which alarm clock 1 may be inserted as shown in that figure. Clock compartment 30 is positioned at the end of base 10 opposite the food compartment 20 with its side walls 32, Figure 3, and lower portion 35 of its front wall, Figure 1, and lower portions of the irregular flange 36, Figure 3, which surrounds the irregular rear opening 34, all resting on raised floor 11 of the base and secured thereto in any suitable manner (not shown).

The rear opening 34 into the clock compartment 30 is closed by a removable shield 37 which is substantially the size of the compartment and secured in place thereon (to cover the opening) by means of a pair of headed pins 38, Figure 1, near the top of the shield and close to the sides thereof, Figure 2. The irregular rear flange 36 of the clock compartment is pierced near the top and both sides thereof, by a pair of round holes 39, Figure 3, sufficiently large to admit the heads of pins 38. At their lowermost points, holes 39 have vertical slots 39ˣ too small for passage of the heads of pins 38 but sufficiently large to receive the stem 38ˣ of the pins, Figure 1. The shield, which may be provided with a finger hook 37′, Figure 1, or by finger hole or holes (as an alternate construction) by which it may be handled, is placed on the compartment by inserting its pair of headed pins 38 in round holes 39 and lowered so that the stem 38ˣ of the pins are received in slots 39ˣ. The shield is removed by lifting it to bring its pins in registry with the holes.

Tray 40 is slidably mounted on base 10 by the provision of a longitudinal groove or undercut portion 43 centrally disposed in the underside of the tray, Figure 4, in which is received a center rail or raised portion 13 of the floor 11 of the base which rail is centrally located in the transverse section through the base, Figure 4, and which extends longitudinally, Figure 2, from the end of the base to which the food compartment 20 is secured, to the front end of the clock compartment 30 which faces the feeding stage 9; the center rail 13 thus traverses the entire length of the food compartment 20 and of the feeding stage 9. A small protuberance or lip 41 extends rearwardly from the rear end of the tray (rightwardly, Figures 1–2) to provide a support for a rod 44 which is screwed or otherwise fastened to the underside of lip 41 and vertically depends therefrom, Figure 1. Center rail or raised guide 13 of the base is cut by a slot 14 which is centrally disposed transversely of the center rail 13 and extends longitudinally, Figure 2, within the food compartment 20. Elongated slot 14 is sufficiently wide to permit rod 44 to clear therethrough. The disposition and length of slot 14 is such as to accommodate the movement of rod 44 as tray 40 is excursioned between its two positions, wholly concealed within food compartment 20 and exposed on feeding stage 9.

The top of tray 40 has a central, circular cavity 42 within which is received a dish 8. The top of the tray also has a pair of longitudinal side runners 46 (for a purpose subsequently explained). Projecting inwardly from the inside, oppositely-facing sides of runners 46 are a pair of arcuate projections 47, Figure 2, dimensioned and shaped to conform to the curvature of dish 8 and which abut the edges thereof extending above the top of the tray, Figure 4.

Vertical rod 44 terminates in an eyelet 45 at its lower end, to which is fastened one end of a cord 7 which extends from the rear end (right end as viewed in Figure 1) of tray 40 to the clock compartment 30 at the left end of the device. It is thus seen that space accommodation for cord 7 and vertical rod 44 is provided by the hollow construction of base 10, as more fully described above, and that, by reason of its disposition within the hollow of the base, it is entirely concealed and removed from possible contact by animals or other interference. Cord 7 extends to the left or clock end of the base and enters the clock compartment 30 through a grommet or bushing 15 passing through the raised floor 11 of the base, see Figure 1, and having rounded, smooth mouths at top and bottom exits to avoid undue wear upon the cord. The end of the cord after passing through base grommet 15 is connected to the alarm clock, as will be described.

Alarm clock 1, which is of a type commonly found on the market and in wide general use, is passed through irregular rear opening 34 of compartment 30 and positioned at the front thereof, with its face 2 occupying front opening 33 of the compartment. The clock is secured in place by a pair of small screws 48 which are passed through apertures provided therefor in the raised floor 11 of the base and screwed in the pedestal of the clock. The alarm rewind knob or key of the clock (not shown) is removed and, in its place, a winding attachment 16, see Figure 6, is screwed on the rewind stem. For this purpose one end of the hub 17 of the attachment is tapped, as indicated at 18, Figure 6. This end of hub 17 is split, as indicated at 19, and a screw 19ˣ provided for tightening the hub; this fastening arrangement would be used where the alarm rewinding stem of the clock is not threaded or otherwise suited to securement in the tapped hub of the attachment, and also to lock the winding attachment to the stem after it has been screwed thereon.

Equally spaced about the hub 17 and extending laterally therefrom are four vanes 6, each of which has at its distal edge a small V-notch 5 centrally located. One of the notches has a narrow slit 4 extending inwardly from the apex of the notch. The end portion of cord 7 which enters through grommet 15 is placed in the V-notches. A knot 3 is made at the end of the cord and the terminal portion of the cord adjacent the knot is inserted in slit 4, the knot 3 being in contact with the vane whose notch is slitted, see Figure 3, to prevent withdrawal of the cord through the slit. By making the cord winding means in the form of vanes (6) instead of a drum, the attachment serves a twofold purpose, namely, for coiling or winding the cord (and thus pulling tray 40 from its normal position concealed within food compartment 20 to its feeding position on feeding stage 9); and for rewinding the alarm spring. The vanes are widely separated so that sufficient space is provided for the fingers to enter in the dihedral angles and grasp the attachment in the manner of a key. Moreover, the large dihedral angles between the vanes provide ample clearances for easily reaching parts at the rear of the clock which are required to be adjusted or manipulated.

Cord 7 is of a predetermined length such that when one end of the cord is secured to winding attachment 16, as shown in Figure 3, the other end of the cord will be secured to vertical rod 44 of the tray, Figure 1, when the tray is in its normal position concealed within feeding compartment 20, as shown in Figure 2, and the cord between the said two points of securement will be fairly taut. It is assumed that the alarm spring has been fully wound (by turning winding attachment 16 in a clockwise direction, as indicated by the arrow) at the time the cord is secured to the attachment 16 in Figure 3. The clock is set, by knob 51, for a predetermined feeding time and the alarm conditioned for operation, by button 52. When that time arrives, the alarm goes off, causing a ringing or buzzing (which the animal soon recognizes as a summons to its meal) and a counterclockwise turning of winding attachment 16. As the vanes turn clockwise, the cord winds or coils thereon, pulling the feeding tray out of the food compartment and onto feeding stage 9, where the food contained within dish 8 becomes available to the animal. To condition the device for the next feeding, attachment 16 is turned in a clockwise direction, the cord during this operation unwinding from the vanes and becoming slack; the tray is then pushed back (rightwardly, Figures 1-2) to its normal position within compartment 20, taking up the said slack in the cord.

The device is so constructed that all parts are entirely enclosed at all times. The clock compartment 30 is completely encased (when shield 37 is in place); base 10 is completely closed and is free of openings into its hollow (wherein the cord 7 is fully housed). The food compartment 20 is fully closed, both when the feeding tray 40 is concealed therein and when it is exposed on feeding stage 9, by the provision of a curtain 26 of flexible material which is secured to the flange 25, Figure 1, at the top of the front opening 24 in feeding compartment 20, and depends therefrom to close the opening, as shown in Figure 5. In that figure, feeding tray 40 is shown in solid lines in its normal position within compartment 20. The side runners 46 on the top of the tray are for the purpose of properly raising curtain 26 to enable passage of the tray to be unhindered. As best shown in Figure 4, the side runners 46 are higher than the top surface of tray 40 and the top edge of dish 8. The ends of the runners 46 are sloped downwardly, the slopes at the front of the tray (left end, Figure 1) are designated 49 while the rear slope is designated 49'. As tray 40 moves out of compartment 20 (leftward, Figure 5) runner slopes 49 engage curtain 26 and raise it to a position on the runners 46, shown by the dot-and-dash lines in Figure 1. When the tray has been completely moved out of its compartment 20, as shown in dot-and-dash lines in Figure 5, the curtain 26 falls to its full length, shown in full lines in that figure, thus effectively closing opening 24 during the time the tray is exposed on the feeding stage. When the tray is moved in the opposite direction (to the right) to its position within compartment 20, the curtain 26 is again raised by runners 46, this time by their rear slopes 49', to the position shown in full lines in Figure 1. In both cases (i. e., movement of the tray out of the compartment and movement into the compartment), curtain 26 is held raised by the side runners 46, as best shown in Figure 4. As shown in that figure, the curtain 26 is raised, by reason of the height of the runners noted above, so that a predetermined space is provided above the top of dish 8. Side runners 46 are thus effective to enable tray 40 to be moved in either direction past the suspended curtain 26 without disturbing the food in dish 8 even if it is heaped above the top of the dish. Instead of a flexible curtain (26) as shown, a rigid door may be provided, hingedly suspended from the flange 25 and swung to a raised position by the runners 46 in a manner similar to that described with reference to the flexible curtain.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except in so far as such limitations are specified in the appended claims.

I claim:

1. An automatic animal feeding device comprising an elongated base flanged on all sides to provide a raised floor and a fully enclosed hollow, an open-bottom compartment secured at one end of the base with the lateral sides and rear wall thereof resting on the raised floor of the base, a second open-bottom compartment secured at the other end of the base, the portion of the base between the two compartments serving as the feeding stage, said raised floor of the base having a center rail extending longitudinally from the first said end of the base, across the length of its said feeding stage to a point close to the second said compartment, a tray having a longitudinal groove centrally recessed in its underside wherein the said center rail is received for guiding the tray for sliding movement from a normal position concealed within the first said or tray compartment to a position exposed on the said feeding stage, the front end of the tray compartment facing the feeding stage having an opening for passage of the tray, an alarm clock having an alarm rewinding stem at its rear face, second said compartment having an opening at its front end facing the said feeding stage and a rear opening for inserting the clock therein, the clock being positioned at the front end of the clock compartment with its face framed in the said front opening thereof and secured to the raised floor of the base, a winding attachment secured to the said rewinding stem of the clock, said base having an aperture in its raised floor entering into the clock compartment, said center rail of the base having an elongated slot longitudinally and centrally disposed therein, a pin depending from said tray and clearing through said slot, a cord fastened at one end to said winding attachment and passing through said base aperture into the said hollow of the base and extending in the hollow towards the tray, the other end of the cord being fastened to the lower end of said pin.

2. An automatic animal feeding device comprising an elongated base flanged on all sides to provide a raised floor and a fully enclosed hollow, an open-bottom compartment secured at one end of the base, a second open-bottom compartment secured at the other end of the base, the portion of the base between the two compartments serving as the feeding stage, said raised floor of the base having a center rail extending longitudinally from the first said end of the base, across the length of its said feeding stage to a point close to the second said compartment, a tray having a longitudinal groove centrally recessed in its underside wherein the said center rail is received for guiding the tray for sliding movement from a normal position concealed within the first said or tray compartment to a position exposed on the said feeding stage, the front end of the tray compartment facing the feeding stage having an opening for passage of the tray, an alarm clock having an alarm rewinding stem at its rear face, second said compartment having a rear opening for inserting the clock therein, the clock being positioned at the front end of the clock compartment and secured to the raised floor of the base, a winding attachment secured to the said rewinding stem of the clock, said base having an aperture in its raised floor entering into the clock compartment, a cord fastened at one end to said winding attachment and passing through said base aperture into the said hollow of the base and extending in the hollow towards the tray, the other end of the cord being fastened to the underside of said tray.

3. An automatic animal feeding device comprising an elongated base flanged on all sides to provide a raised floor and a fully enclosed hollow, an open-bottom compartment secured at one end of the base, a second open-bottom compartment secured at the other end of the base, the portion of the base between the two compartments serving as the feeding stage, a tray mounted on the base for sliding movement from a normal position concealed within the first said or tray compartment to a position exposed on the said feeding stage, the front end of the tray compartment facing the feeding stage having an opening for passage of the tray, an alarm clock having an alarm rewinding stem at its rear face, second said compartment having a rear opening for inserting the clock therein, the clock being positioned at the front end of the clock compartment and secured to the raised floor of the base, a winding attachment secured to the said rewinding stem of the clock, said base having an aperture in its raised floor entering into the clock compartment, the base having an elongated slot longitudinally and centrally disposed therein, a pin depending from said tray and clearing through said slot, a cord fastened at one end to said winding attachment and passing through said base aperture into the said hollow of the base and extending in the hollow towards the tray, the other end of the cord being fastened to the lower end of said pin.

4. An automatic animal feeding device comprising an elongated base flanged on all sides to provide a raised floor and a fully enclosed hollow, an open-bottom compartment secured at one end of the base, a second open-bottom compartment secured at the other end of the base, the portion of the base between the two compartments serving as the feeding stage, a tray mounted on the base for sliding movement from a normal position concealed within the first said or tray compartment to a position exposed on the said feeding stage, the front end of the tray compartment facing the feeding stage having an opening for passage of the tray, an alarm clock having an alarm rewinding stem at its rear face in the second said or clock compartment, a winding attachment secured to the said rewinding stem of the clock, and a cord extending through the said hollow of the base for connecting the said winding attachment and tray.

5. An automatic animal feeding device comprising an elongated base, an open-bottom compartment secured at one end of the base, a second open-bottom compartment secured at the other end of the base, the portion of the base between the two compartments serving as the feeding stage, a tray mounted on the base for sliding movement from a normal position concealed within the first said or tray compartment to a position exposed on the said feeding stage, the front end of the tray compartment facing the feeding stage having an opening for passage of the tray, an alarm clock having an alarm rewinding stem at its rear face, second said compartment having an opening at its front end facing the said feeding stage and a rear opening for inserting the clock therein, the clock being positioned at the front end of the clock compartment with its face framed in the said front opening thereof and secured to the base, a winding attachment secured to the said rewinding stem of the clock, means including a cord connecting the winding attachment to the tray, said winding attachment and manipulative parts of the clock being accessible through the said rear opening of the clock compartment, and a removable shield for closing the said rear opening of the clock compartment.

6. An automatic animal feeding device comprising an elongated base, an open-bottom compartment secured at one end of the base, a second open-bottom compartment secured at the other end of the base, the portion of the base between the two compartments serving as the feeding stage, a tray mounted on the base for sliding movement from a normal position concealed within the first said or tray compartment to a position exposed on the said feeding stage, an alarm clock disposed in the second said compartment, means associated with the said clock for moving the tray at a set time from its said concealed position in the tray compartment to its said exposed position on the feeding stage, the front end of the tray compartment facing the feeding stage having an opening for passage of the tray, and means for closing the said opening both when the tray is in its concealed position and when it is in its exposed position.

7. The device according to claim 6 wherein the said opening in the tray compartment is topped by a narrow flange and the said closing means is a curtain suspended from the said flange.

8. The device according to claim 6 wherein the said tray is further provided with means operative upon the said closing means to provide clearance therebeneath for passage of the tray.

9. An automatic animal feeding device comprising an elongated base, a compartment at one end of the base, a tray slidably mounted on said base and normally concealed in said compartment, the portion of the base in front of the tray compartment serving as a feeding stage, an alarm clock disposed at the other end of the base, means associated with the clock for moving the tray at a set time from its said concealed position within the compartment to an exposed position on the said feeding stage, the front end of the tray compartment facing the feeding stage having an opening for passage of the tray, and a closure for the said opening, the said tray having a pair of longitudinal runners projecting upwardly from its upper surface and at both sides thereof, said runners being operative upon said closure to provide sufficient clearance above the upper tray surface to avoid contacting food carried by the tray.

10. The device according to claim 9 wherein the said runners are beveled downwardly at both ends thereof to facilitate the said operative action on the said closure in said movement of the tray in either direction.

11. An automatic animal feeding device comprising an elongated base, a compartment at one end of the base, a tray slidably mounted on said base and normally concealed in said compartment, the portion of the base in front of the tray compartment serving as a feeding stage, an alarm clock disposed at the other end of the base, means associated with the clock for moving the tray at a set time from its said concealed position within the compartment to an exposed position on the said feeding stage, the front end of the tray compartment facing the feeding stage having an opening for passage of the tray, and a dish for holding food, the said tray being provided in its top surface with a depression for receiving and holding the said dish.

12. An automatic animal feeding device comprising an elongated base, a compartment at one end of the base, a tray slidably mounted on the base and normally concealed in said compartment, the portion of the base in front of the tray compartment serving as a feeding stage, an alarm clock having an alarm rewinding stem at its rear face secured at the other end of the base, a cord fastened at one end to the tray, and an attachment secured to the said rewinding stem of the clock for coiling the said cord thereon, upon functioning of the alarm mechanism, to move the tray from its said concealed position within the tray compartment to an exposed position on the feeding stage, and for rewinding the spring of the alarm mechanism.

13. An automatic animal feeding device comprising an elongated base, a compartment at one end of the base, a tray slidably mounted on the base and normally concealed in said compartment, the portion of the base in front of the tray compartment serving as a feeding stage, an alarm clock having an alarm rewinding stem at its rear face secured at the other end of the base, a cord fastened at one end to the tray, and an attachment secured to the said rewinding stem of the clock and provided with radial vanes, the other end of said cord being fastened to one of said vanes, turning of the attachment, upon functioning of the alarm mechanism of the clock, coiling the cord on the distal edges of the vanes, to move the tray from its said concealed position within the tray compartment to an exposed position on the feeding stage, the vanes being angularly spaced to provide sufficiently large dihedral angles for inserting the fingers to grasp the attachment to rewind the spring of the alarm mechanism.

14. The device according to claim 13 wherein the said vanes are provided at their distal edges with aligned V-notches for receiving the said cord.

JEROME FRANKEL.